United States Patent
Xu et al.

(10) Patent No.: US 10,595,339 B2
(45) Date of Patent: Mar. 17, 2020

(54) SIGNAL TRANSMISSION METHOD, SIGNAL TRANSMISSION CONTROL METHOD, USER EQUIPMENT, AND BASE STATION

(71) Applicant: Huawei Technologies Co., Ltd., Shenzhen (CN)

(72) Inventors: Kai Xu, Shenzhen (CN); Xiaocui Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/088,231

(22) PCT Filed: Mar. 31, 2016

(86) PCT No.: PCT/CN2016/078196
§ 371 (c)(1),
(2) Date: Sep. 25, 2018

(87) PCT Pub. No.: WO2017/166234
PCT Pub. Date: Oct. 5, 2017

(65) Prior Publication Data
US 2019/0320460 A1    Oct. 17, 2019

(51) Int. Cl.
*H04W 74/00*     (2009.01)
*H04L 27/26*     (2006.01)
(Continued)

(52) U.S. Cl.
CPC ....... *H04W 74/006* (2013.01); *H04L 27/2613* (2013.01); *H04W 16/14* (2013.01); *H04W 74/0808* (2013.01)

(58) Field of Classification Search
CPC ............... H04W 74/006; H04W 16/14; H04W 74/0808; H04L 27/2613
See application file for complete search history.

(56) References Cited

U.S. PATENT DOCUMENTS

2012/0014349 A1*   1/2012   Chung ................. H04B 7/0684
                                                        370/329
2013/0100896 A1     4/2013   Chen et al.

FOREIGN PATENT DOCUMENTS

CN    101547022 A    9/2009
CN    102083219 A    6/2011

OTHER PUBLICATIONS

Machine Translation and Abstract of Chinese Publication No. CN101547022, dated Sep. 30, 2009, 36 pages.
(Continued)

*Primary Examiner* — Afshawn M Towfighi
(74) *Attorney, Agent, or Firm* — Conley Rose, P.C.

(57) ABSTRACT

A signal transmission method, a signal transmission control method, a user equipment (UE), and a base station, where the signal transmission method includes performing, by UE, channel detection, and sending, by the UE, uplink data when a result of the channel detection is that a channel is available, where the uplink data includes one or more subframes, at least one subframe includes a sounding reference signal (SRS), and the SRS is located at a start location of the subframe. The signal transmission control method includes sending, by a base station, SRS configuration information to the UE using radio resource control (RRC) signaling or physical downlink control signaling (DCI) such that the UE sends an SRS based on the SRS configuration information. Hence, utilization of a channel can be significantly improved.

20 Claims, 4 Drawing Sheets

(51) Int. Cl.
*H04W 16/14* (2009.01)
*H04W 74/08* (2009.01)

(56) References Cited

OTHER PUBLICATIONS

"Broadband Radio Access Networks (BRAN); 5 GHz high performance RLAN; Harmonized EN covering the essential requirements of article 3.2 of the R&TTE Directive," Final draft, ETSI EN 301 893, V1.8.0, Jan. 2015, 93 pages.
Huawei, et al., "SRS transmission for eLAA," 3GPP TSG RAN WG1 Meeting #84, R1-160301, Feb. 15-19, 2016, 8 pages.
Foreign Communication From a Counterpart Application, PCT Application No. PCT/CN2016/078196, English Translation of International Search Report dated Dec. 27, 2016, 2 pages.
Foreign Communication From a Counterpart Application, PCT Application No. PCT/CN2016/078196, English Translation of Written Opinion dated Dec. 27, 2016, 6 pages.
LG Electronics, "DL/UL solutions of LAA with LBT", R1-150214, 3GPP TSG RAN WG1 Meeting #80, Athens, Greece, Feb. 9-13, 2015, 10 pages.
Foreign Communication From a Counterpart Application, Korean Application No. 10-2018-7026358, Korean Office Action dated Dec. 23, 2019, 6 pages.
Foreign Communication From a Counterpart Application, Korean Application No. 10-2018-7026358, English Translation of Korean Office Action dated Dec. 23, 2019, 9 pages.

* cited by examiner

SIGNAL TRANSMISSION METHOD, SIGNAL TRANSMISSION CONTROL METHOD, USER EQUIPMENT, AND BASE STATION

CROSS-REFERENCE TO RELATED APPLICATIONS

This application is a U.S. National Stage of International Patent Application No. PCT/CN2016/078196 filed on Mar. 31, 2016, which is hereby incorporated by reference in its entirety.

TECHNICAL FIELD

The present invention relates to communications technologies, and in particular, to a signal transmission method, a signal transmission control method, user equipment, and a base station.

BACKGROUND

In licensed-assisted access using LTE (Licensed-Assisted Access using LTE, LAA-LTE for short), a licensed spectrum is used as a primary component carrier (Primary Component Carrier, PCC) and an unlicensed spectrum is used as a secondary component carrier (Secondary Component Carrier, SCC) based on a carrier aggregation technology to offload data services on the licensed spectrum, to effectively increase a data transmission rate and implement hotspot coverage. In an LAA-LTE system, a channel resource is used based on a channel access mechanism of listen before talk (Listen Before Talk, LBT for short). To be specific, a sending node first performs clear channel assessment (Clear Channel Assessment, CCA for short) before sending a signal, and can occupy a channel to send the signal only after detecting that the channel is idle.

In a signal sending process, a sounding reference signal (Sounding Reference Signal, SRS for short) in uplink transmission is used to estimate quality of uplink channels with different frequencies. Estimated channel quality may be used for scheduling of uplink transmission, and a resource block with a relatively good channel state is allocated for uplink transmission. In addition, the estimated channel quality is used for selection between different transmission parameters such as an instantaneous data rate.

However, an SRS transmission mechanism in an existing LTE system is not perfect and cannot meet a requirement of signal transmission in the LAA-LTE system.

SUMMARY

The present invention provides a signal transmission method, a signal transmission control method, user equipment, and a base station, to meet a requirement of signal transmission in an LAA-LTE system.

A first aspect of the present invention provides a signal transmission method, including:

performing, by UE, channel detection; and if a result of the channel detection is that a channel is not occupied, sending, by the UE, uplink data, where the uplink data includes one or more subframes, at least one subframe includes an SRS, and the SRS is located at a start location of the subframe. In this method, after performing the channel detection, the UE adds the SRS to the sent uplink data, and the SRS is located at the start location of the subframe of the uplink data, to significantly improve utilization of the channel.

In a possible design, before sending the uplink data, the UE first receives the SRS configuration information sent by the base station. How to send the SRS is determined by the base station, and the base station sends the SRS configuration information to the UE by using a particular message, so that the UE can send the SRS based on the SRS configuration message, to help the base station perform unified management on an SRS sending policy of the UE.

A second aspect of the present invention provides a signal transmission control method, including:

sending, by a base station, sounding reference signal SRS configuration information to user equipment UE by using radio resource control RRC signaling or physical downlink control signaling DCI, where the information enables the UE to send an SRS based on a configuration requirement of the information. In other words, the SRS sending policy is determined by the base station, to help the base station perform unified management on the SRS sending policy of the UE.

A third aspect of the present invention provides user equipment, including:

a processing module, configured to perform channel detection; and a sending module, configured to: if a result of the channel detection is that a channel is not occupied, send uplink data, where the uplink data includes one or more subframes, at least one subframe includes a sounding reference signal SRS, and the SRS is located at a start location of the subframe.

In a possible design, the user equipment further includes:

a receiving module, configured to receive SRS configuration information sent by a base station.

A fourth aspect of the present invention provides a base station, including: a sending module, configured to send sounding reference signal SRS configuration information to user equipment UE by using radio resource control RRC signaling or physical downlink control signaling DCI, so that the UE sends an SRS based on the SRS configuration information.

A fifth aspect of the present invention provides user equipment, including a memory and a processor.

The memory is configured to store a program instruction. The processor is configured to invoke the program instruction in the memory to perform the following method:

performing channel detection; and if a result of the channel detection is that a channel is not occupied, sending uplink data, where the uplink data includes one or more subframes, at least one subframe includes a sounding reference signal SRS, and the SRS is located at a start location of the subframe.

In a possible design, the processor is configured to receive the SRS configuration information sent by the base station.

A sixth aspect of the present invention provides a base station, including a memory and a processor.

The memory is configured to store a program instruction. The processor is configured to invoke the program instruction in the memory to perform the following method:

sending SRS configuration information to UE by using RRC or DCI, so that the UE sends an SRS based on the SRS configuration information.

In a possible design, the SRS is located in a first subframe of uplink data, and the first subframe is a subframe in which physical uplink shared channel PUSCH data is not to be sent. The SRS is arranged at a start location of a first subframe of uplink data following CCA for transmission, so that the UE can quickly access a channel. Therefore, utilization of the channel is improved, and uplink transmission channel resources may also be saved.

In a possible design, SRSs are located in a first subframe of the uplink data and a subframe at a middle location of the uplink data. In this case, a size of the uplink data sent by the UE at a time is relatively large, and if the SRS is arranged at the start location or an end location of only the first subframe of the uplink data, channel frequency may be inaccurately estimated. Therefore, in this embodiment, the SRSs are arranged at the start location or end location of the first subframe of the uplink data and a start location or end location of the middle subframe of the uplink data, to ensure that the channel frequency is accurately estimated when the size of the uplink data is relatively large.

In a possible design, the SRS is located in each subframe of the uplink data. In this case, a size of uplink data transmitted by the UE at a time is extremely large, and one SRS is added to each subframe of the uplink data, to improve, to a greatest extent, accuracy of estimating the channel frequency.

In a possible design, the SRS is in a discrete bandwidth occupancy mode in frequency domain.

In a possible design, if the SRS configuration information is a periodic SRS configuration, the SRS configuration information includes SRS sending period information and offset information of a subframe in each SRS sending period; or if the SRS configuration information is an aperiodic SRS configuration, the SRS configuration information includes location information of the SRS sent by the UE, and the location information of the SRS is used to indicate a location of the SRS in the uplink data.

In a possible design, the SRS occupies at least one single carrier frequency division multiple access SC-FDMA symbol in the subframe.

Compared with the prior art, in solutions provided in the embodiments of the present invention, utilization of the channel can be significantly improved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
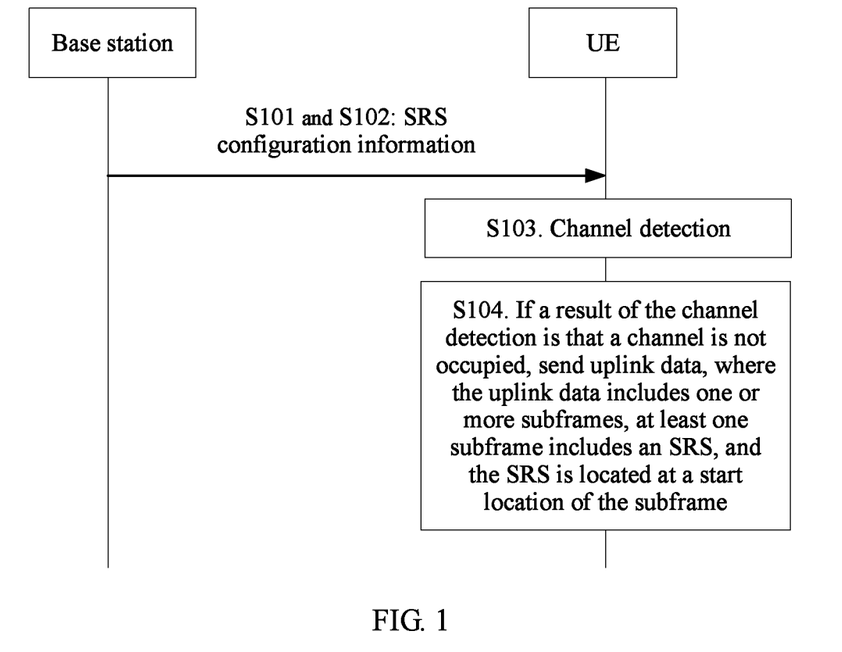
FIG. 1 is an interaction flowchart of Embodiment 1 of a signal transmission method and a signal transmission control method according to an embodiment of the present invention.

FIG. 1 is an interaction flowchart of Embodiment 1 of a signal transmission method and a signal transmission control method according to an embodiment of the present invention. The method is used for interaction between user equipment (User Equipment, UE for short) and a base station. An interaction process is as follows:

S101. A base station sends SRS configuration information to UE by using radio resource control (Radio Resource Control, RRC for short) signaling or downlink control information (Downlink Control Information, DCI for short), so that the UE sends an SRS based on the SRS configuration information.

The SRS configuration information may be a periodic SRS configuration or an aperiodic SRS configuration.

For the periodic SRS configuration, the SRS configuration information includes SRS sending period information and offset information of a subframe in each SRS sending period. The SRS configuration information is determined by the base station based on a current network status. For example, the base station may configure the SRS sending period as 100 ms. In other words, the UE sends the SRS at a time at intervals of 100 ms (100 subframes), and configures the offset as two subframes. To be specific, an SRS is added at a location with the offset of two subframes in each SRS sending period. For the aperiodic SRS configuration, the SRS configuration information includes location information of the SRS sent by the UE, and the location information is used to indicate a location of the SRS in the uplink data.

The base station sends the SRS configuration information to the UE, so that the UE sends the SRS based on the configuration information. To be specific, the base station controls, by using the SRS configuration information, information such as frequency and a location of sending the SRS by the UE.

Optionally, the base station sends the configuration information by using a physical downlink control channel (Physical Downlink Control Channel, PDCCH for short).

S102. The UE receives the SRS configuration information sent by the base station.

As mentioned above, the SRS configuration information may be the periodic SRS configuration or the aperiodic SRS configuration.

If the SRS configuration information received by the UE is the periodic SRS configuration, the SRS configuration information includes the SRS sending period and the offset information of the subframe in each SRS sending period; or if the SRS configuration information received by the UE is the aperiodic SRS configuration, the SRS configuration information includes location information of the SRS sent by the UE, and the location information is used to indicate the location of the SRS in the uplink data.

S103. The UE performs channel detection.

Preferably, the UE may perform clear channel assessment (Clear Channel Assessment, CCA for short) to determine whether there is an available idle channel.

S104. If a result of the channel detection is that a channel is not occupied, the UE sends the uplink data, where the uplink data includes one or more subframes, at least one subframe includes the SRS, and the SRS is located at a start location of the subframe.

When the result of the channel detection is that there is the unoccupied channel, the UE starts to send the uplink data by using the unoccupied channel, and the uplink data includes the SRS. In other words, the SRS is sent after the idle channel is found. In addition, the SRS is located at the start location of the subframe in the uplink data. In addition, the subframe in which the SRS is located is determined by the UE based on configuration information of the periodic SRS or the aperiodic SRS sent by the base station. For example, the configuration information sent by the base station instructs the UE to add the SRS to a first subframe of each piece of uplink data, and the SRS sent by the UE is located at the start location of the first subframe of the uplink data.

In this embodiment, after performing the channel detection, the UE adds the SRS to the sent uplink data, and the SRS is located at the start location of the subframe of the uplink data, to improve utilization of the channel.

Based on the foregoing embodiment, this embodiment relates to a location of a subframe in which an SRS is located. To be specific, the SRS is located in the first subframe of the uplink data, and the first subframe is a subframe in which physical uplink shared channel (Physical Uplink Shared Channel, PUSCH for short) data is not to be sent.

Figure 2:
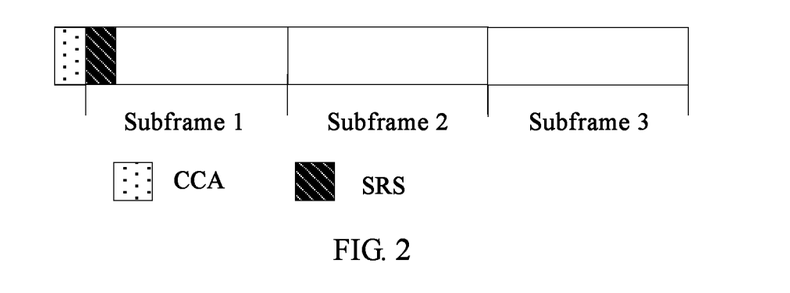
FIG. 2 is a schematic diagram illustrating that an SRS is located in a first subframe of uplink data.

Specifically, FIG. 2 is a schematic diagram illustrating that an SRS is located in a first subframe of uplink data. As shown in FIG. 2, it is assumed that uplink data sent by UE at a time, that is, one burst, includes three subframes, the SRS is located at a start location of a first subframe of the burst following the CCA, but the other subframes of the burst do not include the SRS.

The SRS is arranged at the start location of the first subframe of the uplink data following the CCA for transmission, so that the UE can quickly access the channel. Therefore, utilization of the channel is improved, and uplink transmission channel resources may also be saved.

Based on the foregoing embodiment, this embodiment relates to a location of a subframe in which an SRS is located. To be specific, SRSs are located in a first subframe of uplink data and a subframe at a middle location of the uplink data.

The first subframe is a subframe in which PUSCH data is not to be sent, and the subframe at the middle location of the uplink data may be a subframe in which PUSCH data is to be sent or a subframe in which PUSCH data is not to be sent.

Figure 3:
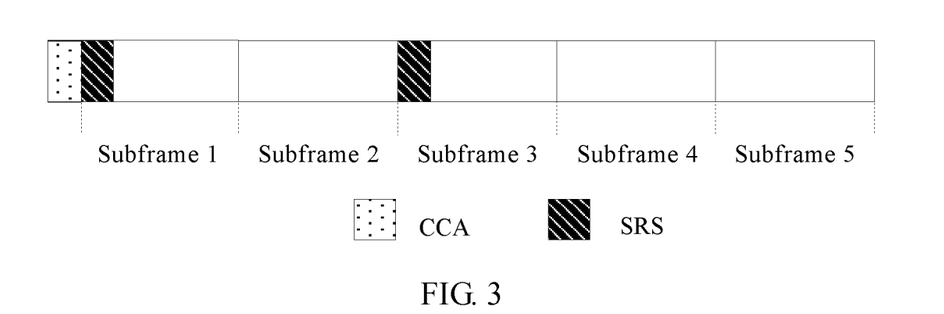
FIG. 3 is a schematic diagram illustrating that SRSs are located in a first subframe of uplink data and a subframe at a middle location of the uplink data.

Specifically, FIG. 3 is a schematic diagram illustrating that SRSs are located in a first subframe of uplink data and a subframe at a middle location of the uplink data. As shown in FIG. 3, it is assumed that uplink data sent by UE at a time, that is, one burst, includes five subframes, and the burst includes two SRSs. The two SRSs are respectively located at a start location of a subframe 1 of the burst following the CCA, and a start location of a middle subframe 3.

In addition, the SRSs may be located at end locations of the two subframes.

In this case, a size of the uplink data sent by the UE at a time is relatively large, and if the SRS is arranged at the start location or the end location of only the first subframe of the uplink data, channel frequency may be inaccurately estimated. Therefore, in this embodiment, the SRSs are arranged at the start location or end location of the first subframe of the uplink data and a start location or end location of the middle subframe of the uplink data, to ensure that the channel frequency is accurately estimated when the size of the uplink data is relatively large.

Further, in addition to the foregoing method, based on an actual network status, one SRS may be added to uplink data sent at a time, and the SRS may be located at a start location of any subframe of the uplink data; or two SRSs are added to uplink data sent at a time, and the two SRSs may be located at start locations of any two subframes of the uplink data, to improve, to a greatest extent, accuracy of estimating the channel frequency. The subframes may be subframes with PUSCH data sending or subframes without PUSCH data sending.

Based on the foregoing embodiment, this embodiment relates to a location of a subframe in which an SRS is located. To be specific, the SRS is located in each subframe of uplink data.

Figure 4:
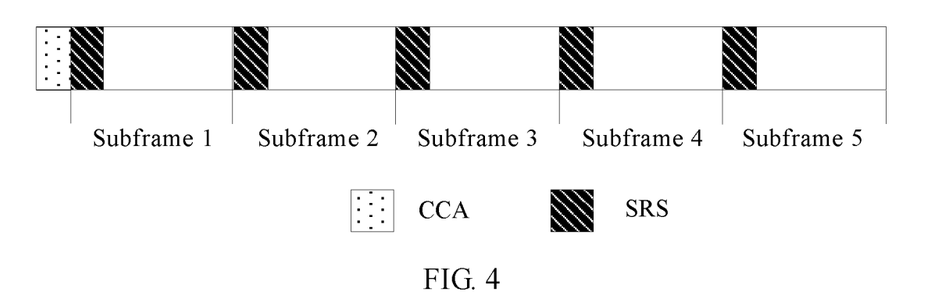
FIG. 4 is a schematic diagram illustrating that an SRS is located in each subframe of uplink data.

Specifically, FIG. 4 is a schematic diagram illustrating that an SRS is located in each subframe of uplink data. As shown in FIG. 4, it is assumed that uplink data sent by UE at a time, that is, one burst, includes five subframes, and there is one SRS at a start location of each subframe in the burst.

The subframe in which the SRS is located may be a subframe in which PUSCH data is to be sent or a subframe in which PUSCH data is not to be sent.

In this case, a size of uplink data transmitted by the UE at a time is extremely large, and one SRS is added to each subframe of the uplink data, to improve, to a greatest extent, accuracy of estimating channel frequency.

In another embodiment, the SRS is in a discrete bandwidth occupancy mode in frequency domain.

Figure 5:
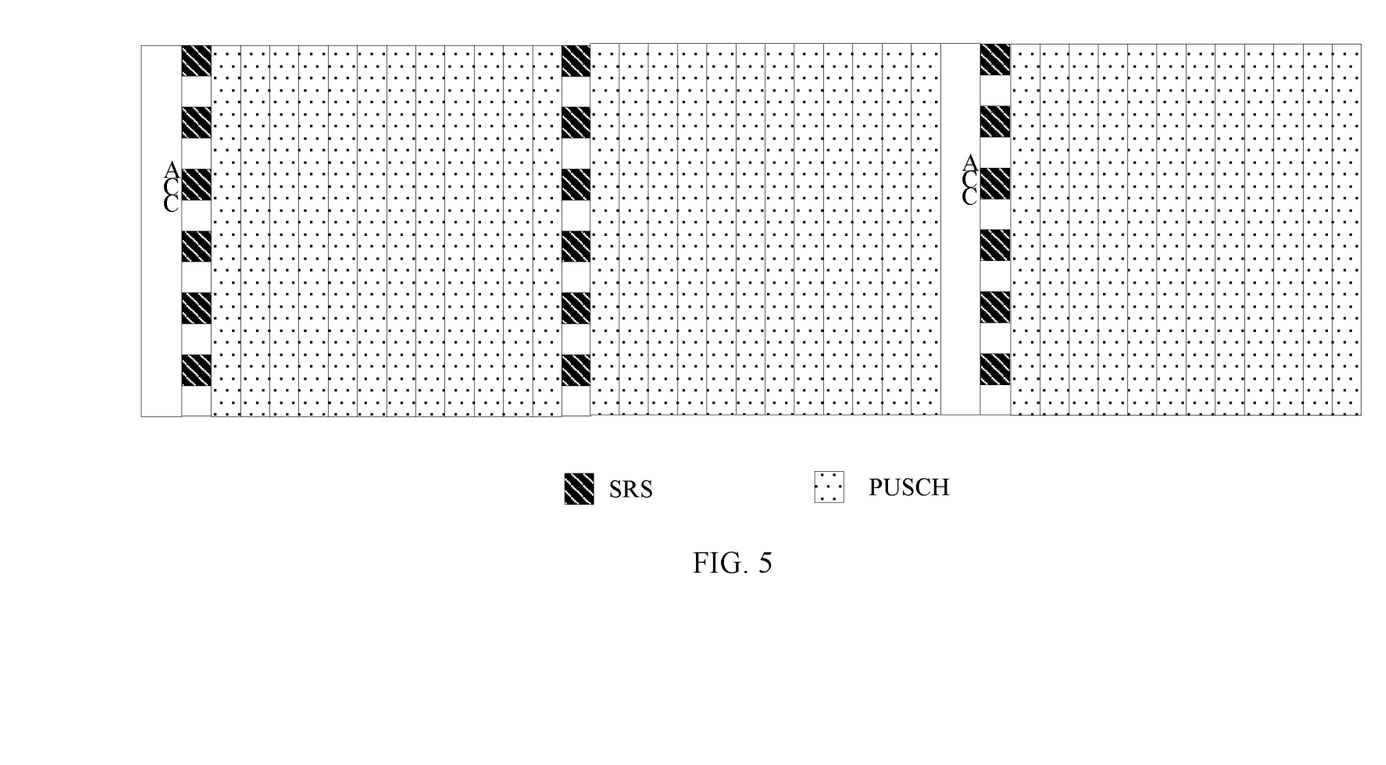
FIG. 5 is a schematic diagram of distribution of an SRS in frequency domain.

FIG. 5 is a schematic diagram of distribution of an SRS in frequency domain. As shown in FIG. 5, the SRS does not occupy full bandwidth in frequency domain, but may share the bandwidth with another SRS in a multiplexing manner. Specifically, frequency division multiplexing may be performed when the SRS is in an SRS Comb mode, so that each SRS can occupy 80% or more of the full bandwidth in the discrete bandwidth occupancy mode.

Based on the foregoing embodiment, the foregoing SRS occupies at least one single carrier frequency division multiple access (Single carrier Frequency Division Multiple Access, SC-FDMA for short) symbol in the subframe in which the SRS is located. Preferably, each SRS occupies the first one or two SC-FDMA symbols of the subframe in which the SRS is located.

Figure 6:
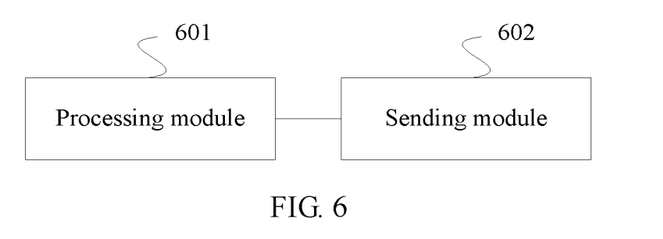
FIG. 6 is a structural diagram of modules in Embodiment 1 of user equipment according to an embodiment of the present invention.

FIG. 6 is a structural diagram of modules in Embodiment 1 of user equipment according to an embodiment of the present invention. As shown in FIG. 6, the user equipment includes:

a processing module 601, configured to perform channel detection; and a sending module 602, configured to: if a result of the channel detection is that a channel is not occupied, send uplink data, where the uplink data includes one or more subframes, at least one subframe includes an SRS, and the SRS is located at a start location of the subframe.

The user equipment is configured to implement the foregoing method embodiment. An implementation principle and a technical effect of the user equipment are similar to those of the method embodiment. Details are not described herein again.

Further, the SRS is located in a first subframe of the uplink data, and the first subframe is a subframe in which PUSCH data sending is not to be sent.

Further, SRSs are located in a first subframe of the uplink data and a subframe at a middle location of the uplink data.

Further, the SRS is located in each subframe of the uplink data.

Further, the SRS is in a discrete bandwidth occupancy mode in frequency domain.

Figure 7:
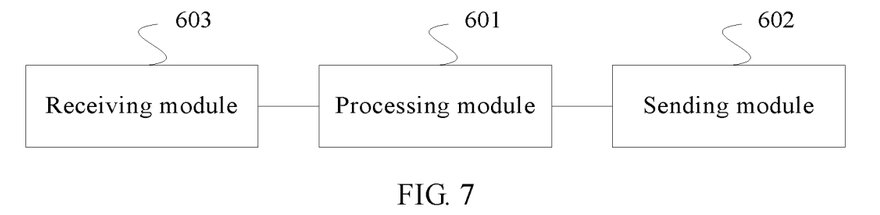
FIG. 7 is a structural diagram of modules in Embodiment 2 of user equipment according to an embodiment of the present invention.

FIG. 7 is a structural diagram of modules in Embodiment 2 of user equipment according to an embodiment of the present invention. As shown in FIG. 7, based on FIG. 6, the user equipment further includes:

a receiving module 603, configured to receive SRS configuration information sent by a base station.

Further, if the SRS configuration information is a periodic SRS configuration, the SRS configuration information includes SRS sending period information and offset information of a subframe in each SRS sending period; or if the SRS configuration information is an aperiodic SRS configuration, the SRS configuration information includes location information of the SRS sent by the UE, and the location information of the SRS is used to indicate a location of the SRS in the uplink data.

Further, the SRS occupies at least one SC-FDMA symbol in the subframe.

Figure 8:
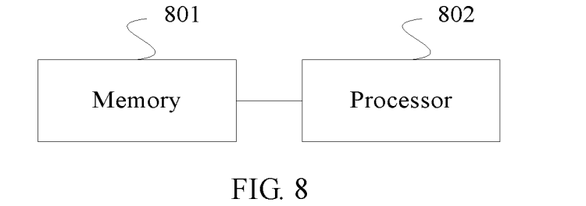
FIG. 8 is a structural diagram of modules in Embodiment 3 of user equipment according to an embodiment of the present invention.

FIG. 8 is a structural diagram of modules in Embodiment 3 of user equipment according to an embodiment of the present invention. As shown in FIG. 8, the user equipment includes a memory 801 and a processor 802.

The memory 801 is configured to store a program instruction. The processor 802 is configured to invoke the program instruction in the memory 801 to perform the following method:

performing channel detection; and if a result of the channel detection is that a channel is not occupied, sending uplink data, where the uplink data includes one or more subframes, at least one subframe includes a sounding reference signal SRS, and the SRS is located at a start location of the subframe.

Further, the SRS is located in a first subframe of the uplink data, and the first subframe is a subframe in which PUSCH data is not to be sent.

Further, SRSs are located in a first subframe of the uplink data and a subframe at a middle location of the uplink data.

Further, the SRS is located in each subframe of the uplink data.

Further, the SRS is in a discrete bandwidth occupancy mode in frequency domain.

Further, the processor 802 is configured to receive SRS configuration information sent by a base station.

Further, if the SRS configuration information is a periodic SRS configuration, the SRS configuration information includes SRS sending period information and offset information of a subframe in each SRS sending period; or if the SRS configuration information is an aperiodic SRS configuration, the SRS configuration information includes location information of the SRS sent by the UE, and the location information of the SRS is used to indicate a location of the SRS in the uplink data.

Further, the SRS occupies at least one SC-FDMA symbol in the subframe.

Figure 9:
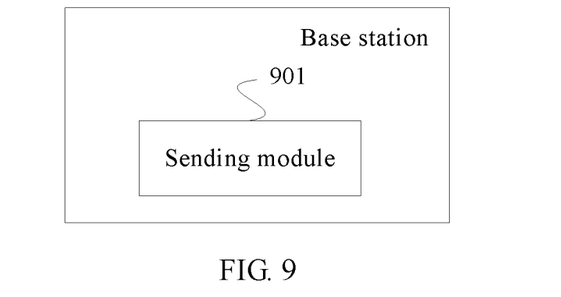
FIG. 9 is a structural diagram of modules in Embodiment 1 of a base station according to an embodiment of the present invention.

FIG. 9 is a structural diagram of modules in Embodiment 1 of a base station according to an embodiment of the present invention. As shown in FIG. 9, the base station includes:

a sending module 901, configured to send sounding reference signal SRS configuration information to UE by using RRC or DCI, so that the UE sends an SRS based on the SRS configuration information.

The base station is configured to implement the foregoing method embodiment. An implementation principle and a technical effect of the base station are similar to those of the method embodiment. Details are not described herein again.

Further, if the SRS configuration information is a periodic SRS configuration, the SRS configuration information includes SRS sending period information and offset information of a subframe in each SRS sending period; or if the SRS configuration information is an aperiodic SRS configuration, the SRS configuration information includes location information of the SRS sent by the UE, and the location information of the SRS is used to indicate a location of the SRS in uplink data.

Figure 10:
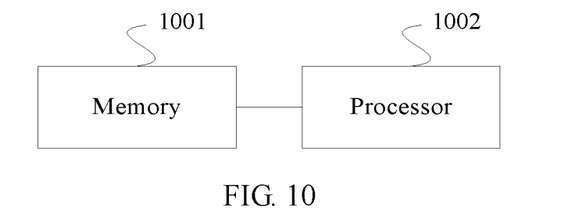
FIG. 10 is a structural diagram of modules in Embodiment 2 of a base station according to an embodiment of the present invention.

FIG. 10 is a structural diagram of modules in Embodiment 2 of a base station according to an embodiment of the present invention. As shown in FIG. 10, the base station includes a memory 1001 and a processor 1002.

The memory 1001 is configured to store a program instruction. The processor 1002 is configured to invoke the program instruction in the memory 1001 to perform the following method:

sending SRS configuration information to UE by using RRC or DCI, so that the UE sends an SRS based on the SRS configuration information.

Further, if the SRS configuration information is a periodic SRS configuration, the SRS configuration information includes SRS sending period information and offset information of a subframe in each SRS sending period; or if the SRS configuration information is an aperiodic SRS configuration, the SRS configuration information includes location information of the SRS sent by the UE, and the location information of the SRS is used to indicate a location of the SRS in uplink data.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in

What is claimed is:

1. A signal transmission method, comprising:
performing, by a user equipment (UE), channel detection; and
sending, by the UE, uplink data when a result of the channel detection is that a channel is available, wherein the uplink data comprises a plurality of subframes, wherein a first subframe comprises a sounding reference signal (SRS) located at an end location of the first subframe, and wherein a middle subframe comprises an SRS located at an end location of the middle subframe.

2. The method of claim 1, wherein the first subframe comprises a subframe in which an SRS alone is sent and physical uplink shared channel (PUSCH) data is not sent.

3. The method of claim 1, wherein the end location of the first subframe comprises the final location of the first subframe.

4. The method of claim 1, wherein the end location of the first subframe comprises the starting location of the first subframe.

5. The method of claim 1, wherein the SRS is in a discrete bandwidth occupancy mode in frequency domain.

6. The method of claim 1, wherein before the method further comprises receiving, by the UE, SRS configuration information from a base station before sending the uplink data.

7. The method of claim 6, wherein the SRS configuration information comprises:
SRS sending period information and offset information of a subframe in each SRS sending period when the SRS configuration information comprises a periodic SRS configuration; and
location information of the SRS received from the UE when the SRS configuration information comprises an aperiodic SRS configuration, wherein the location information of the SRS indicates a location of the SRS in the uplink data.

8. The method of claim 1, wherein the middle subframe comprises a subframe in which an SRS alone is sent and physical uplink shared channel (PUSCH) data is not sent.

9. The method of claim 1, wherein the end location of the middle subframe comprises the final location of the middle subframe.

10. The method of claim 1, wherein the end location of the middle subframe comprises the starting location of the middle subframe.

11. A user equipment (UE), comprising:
a processor configured to perform channel detection; and
a transmitter coupled to the processor and configured to send uplink data when a result of the channel detection is that a channel is available, wherein the uplink data comprises a plurality of subframes, wherein a first subframe comprises a sounding reference signal (SRS) located at an end location of the first subframe, and wherein a middle subframe comprises an SRS located at an end location of the middle subframe.

12. The UE of claim 11, wherein the first subframe comprises a subframe in which an SRS alone is sent and physical uplink shared channel (PUSCH) data is not sent.

13. The UE of claim 11, wherein the end location of the first subframe comprises the final location of the first subframe.

14. The UE of claim 11, wherein the end location of the first subframe comprises the starting location of the first subframe.

15. The UE of claim 11, wherein the SRS is in a discrete bandwidth occupancy mode in frequency domain.

16. The UE of claim 11, further comprising a receiver coupled to the processor and the transmitter and configured to receive SRS configuration information from a base station.

17. The UE of claim 16, wherein the SRS configuration information comprises:
SRS sending period information and offset information of a subframe in each SRS sending period when the SRS configuration information comprises a periodic SRS configuration; and
location information of the SRS received from the UE when the SRS configuration information comprises an aperiodic SRS configuration and the location information of the SRS indicating a location of the SRS in the uplink data.

18. The method of claim 11, wherein the middle subframe comprises a subframe in which an SRS alone is sent and physical uplink shared channel (PUSCH) data is not sent.

19. The method of claim 11, wherein the end location of the middle subframe comprises the final location of the middle subframe.

20. The method of claim 11, wherein the end location of the middle subframe comprises the starting location of the middle subframe.

* * * * *